United States Patent
Suganuma et al.

(10) Patent No.: US 7,169,501 B2
(45) Date of Patent: Jan. 30, 2007

(54) FUEL CELL

(75) Inventors: Shigeaki Suganuma, Nagano (JP); Michio Horiuchi, Nagano (JP); Misa Watanabe, Nagano (JP); Ryo Fukasawa, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 475 days.

(21) Appl. No.: 10/732,233

(22) Filed: Dec. 11, 2003

(65) Prior Publication Data

US 2004/0121197 A1    Jun. 24, 2004

(30) Foreign Application Priority Data

Dec. 16, 2002  (JP)  .............. 2002-363386

(51) Int. Cl.
 *H01M 8/02*  (2006.01)
 *H01M 4/90*  (2006.01)
(52) U.S. Cl. .......................... 429/34; 429/40
(58) Field of Classification Search .......... 429/12, 429/34, 30, 33, 40
 See application file for complete search history.

(56) References Cited

U.S. PATENT DOCUMENTS 3,400,305 A * 9/1968 Coffman .................. 361/434
4,240,882 A   12/1980 Ang et al. ................. 204/75
5,458,756 A * 10/1995 Bassous et al. ......... 204/224 R
6,555,260 B2 * 4/2003 Aberle et al. ............ 429/26

FOREIGN PATENT DOCUMENTS

| EP | 1 179 730 | 2/2002 |
| JP | 54-87291 | 7/1979 |
| JP | 2003-187823 | * 7/2003 |

OTHER PUBLICATIONS

Hibino, Takashi, et al., "A Low-Operating-Temperature Solid Oxide Fuel Cell in Hydrocarbon-Air Mixtures", SCIENCE, vol. 288, Jun. 16, 2000, pp. 2031-2033.
Hibino, Takashi, et al., "High Performance Anodes for SOFCs Operating in Methane-Air Mixture at Reduced Temperatures", Journal of the Electrochemical Society.
European Search Report and Annex Apr. 14, 2005.

* cited by examiner

Primary Examiner—Stephen J. Kalafut
(74) Attorney, Agent, or Firm—Staas & Halsey LLP (57) ABSTRACT

A single chamber fuel cell comprised of a cell arranged in a mixed fuel gas comprised of hydrogen or another fuel gas and oxygen, wherein the cell used is a pn junction type semiconductor having electrodes of a p-type semiconductor with carriers of holes and an n-type semiconductor with carriers of electrons connected to ends of electrical takeout wires, and each of the p-type semiconductor and n-type semiconductor is formed porous to an extent enabling the mixed fuel gas to pass.

2 Claims, 4 Drawing Sheets

MIXED FUEL GAS

PRIOR ART

Fig.5

FUEL CELL

BACKGROUND OF THE INVENTION

1. Field of the Invention

The present invention relates to a fuel cell, more particularly relates to a single chamber fuel cell in which a cell is placed in a mixed fuel gas comprised of hydrogen or another fuel gas and oxygen.

2. Description of the Related Art

Figure 5:
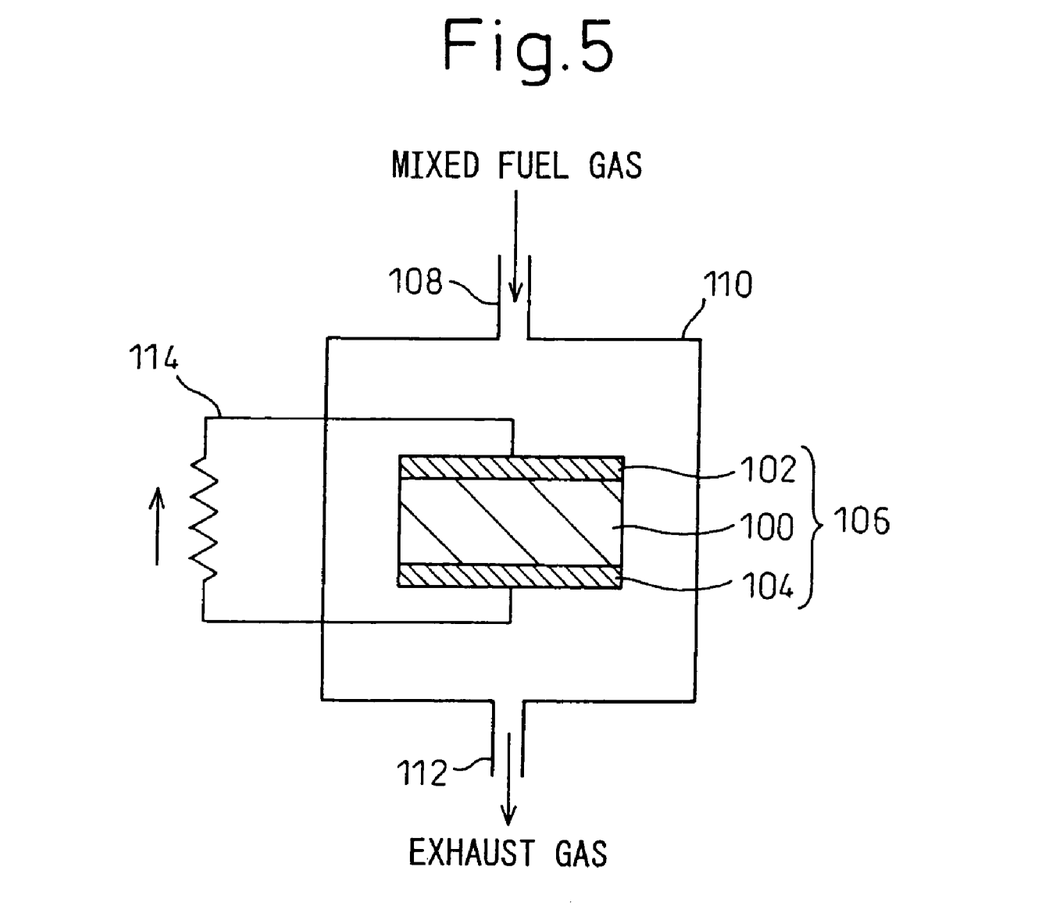
FIG. 5 is an explanatory view for explaining a conventional fuel cell.

Science, vol. 288 (2000), p. 2031–2033, Journal of The Electrochemical Society, 149 (2) A133–A136 (2002), etc. propose a single chamber fuel cell shown in FIG. 5. The single chamber fuel cell shown in FIG. 5 consists of a cell 106, comprised of a solid electrolyte layer 100 on the two sides of which a cathode layer 102 and anode layer 104 are formed, placed in a chamber 110 supplied with a mixed fuel gas of a fuel gas and oxygen or an oxygen-containing gas through a feed pipe 108. The drive temperature of the fuel cell is about 500 to 600° C. The gas in the chamber 110 is exhausted outside of the system through an exhaust pipe 112.

According to the single chamber fuel cell shown in FIG. 5, by placing the cell 106 in a mixed fuel gas, it is possible to place the entire cell 106 in substantially the same atmosphere. Therefore, the cell 106 can be improved in durability compared with a double chamber fuel cell exposing the two sides of the cell to different atmospheres.

In the single chamber fuel cell shown in FIG. 5, power is generated in the following way. That is, the oxygen ($O_2$) at the cathode layer 102 side of the cell 106 is ionized to oxygen ions ($O^{2-}$) at the boundary of the cathode layer 102 and the solid electrolyte layer 100 comprised of YSZ or another solid electrolyte. The oxygen ions ($O^{2-}$) are conducted to the anode layer 104 by the solid electrolyte layer 100. The oxygen ions ($O^{2-}$) conducted to the anode layer 104 react with methane ($CH_4$) or another fuel gas supplied to the anode layer 104 whereby water ($H_2O$), carbon dioxide ($CO_2$), hydrogen ($H_2$), and carbon monoxide (CO) are produced. During this reaction, the oxygen ions discharge electrons, so a potential difference arises between the cathode layer 102 and anode layer 104. Therefore, by electrically connecting the cathode layer 102 and anode layer 104 by a takeout line 114, the electrons of the anode layer 104 flow through the takeout line 114 in the direction of the cathode layer 102 (arrow direction) and electricity can be taken out from the fuel cell.

In the single chamber fuel cell shown in FIG. 5, however, the reaction at the cathode layer 102 side and the reaction at the anode layer 104 side are believed to occur simultaneously mixed without differentiation between the cathode layer 102 side and the anode layer 104 side. Therefore, for example, sometimes the oxygen ions ($O^{2-}$) produced at the cathode layer 102 side of the solid electrolyte layer 100 react with the methane ($CH_4$) or other fuel gas (oxidation reaction) present even at the cathode layer 102 side. In this case, electrons are transferred only at the cathode layer 102 side, no potential difference arises between the cathode layer 102 and anode layer 104, and electrical energy cannot be taken out. Therefore, in a single chamber fuel cell, the power generation efficiency is liable to drop.

Further, the oxygen ions produced at the boundary of the cathode layer 102 and solid electrolyte layer 100 are conducted through the solid electrolyte layer 100 and move to the anode layer 104 side. Therefore, a large resistance acts in the conduction of oxygen ions through the solid electrolyte layer 100. From this viewpoint as well, in a single chamber fuel cell, the power generation efficiency is liable to drop.

SUMMARY OF THE INVENTION

An object of the present invention is to provide a single chamber fuel cell where a cell is placed in a mixed fuel gas of a fuel gas and oxygen mixed together wherein even if ionization of oxygen and the reaction between the oxygen ions and fuel gas proceed simultaneously at the same surface of the cell, electricity can be taken out and the loss due to conduction of the oxygen ions produced can be kept to a minimum.

The inventors engaged in studies to achieve this object and as a result discovered that it is suitable to use a pn junction type semiconductor as a cell and thereby completed the present invention.

According to a first aspect of the present invention, there is provided a single chamber fuel cell comprised of a cell arranged in a mixed fuel gas comprised of hydrogen or another fuel gas and oxygen, wherein the cell used is a pn junction type semiconductor having electrodes of a p-type semiconductor with carriers of holes and an n-type semiconductor with carriers of electrons connected to ends of electrical takeout wires, and each of the p-type semiconductor and n-type semiconductor is formed porous to an extent enabling the mixed fuel gas to pass.

In the present invention, preferably the p-type semiconductor and n-type semiconductor are provided between them with a porous pn mixed layer formed by particles of the p-type semiconductor and particles of the n-type semiconductor mixed together to an extent enabling mixed fuel gas to pass, whereby the pn junction area of the p-type semiconductor and n-type semiconductor can be enlarged. Further, by mixing an oxidation catalyst into the pn mixed layer, the reaction between the fuel gas and oxygen at the pn junction can be accelerated.

The detailed mechanism enabling power generation by using as a cell a pn junction type semiconductor made porous to an extent where the mixed fuel gas can pass, the following can be considered. That is, in a pn junction type semiconductor comprised of a p-type semiconductor and n-type semiconductor adjoining each other across a depletion layer (pn boundary phase), the adsorption of oxygen to the p-type semiconductor surface and the adsorption of fuel gas to the n-type semiconductor surface occur simultaneously. When a water generating reaction is caused between the adsorbed two, electron-hole pairs are generated near the depletion layer.

Among the electron-hole pairs produced, the electrons move to the n-type semiconductor side, while the holes move to the p-type semiconductor side. As a result, a potential difference arises between the n-type semiconductor side and the p-type semiconductor side and the potential difference can be taken out as electricity. Further, since the movement of the electron-hole pairs produced is movement of electrons and holes, the movement resistance can substantially be ignored compared with the case of conduction of oxygen ions through a solid electrolyte layer.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

Figure 1A:
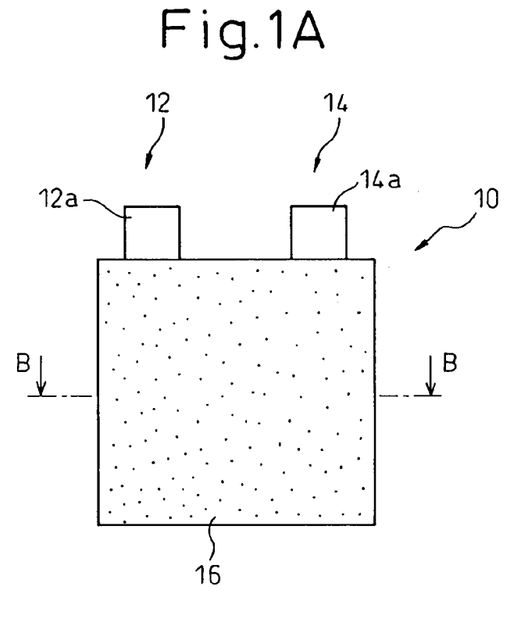
FIGS. 1A, 1B, and 1C are a front view and horizontal sectional views for explaining a pn junction type semiconductor used for a fuel cell according to the present invention.
Figure 1B:
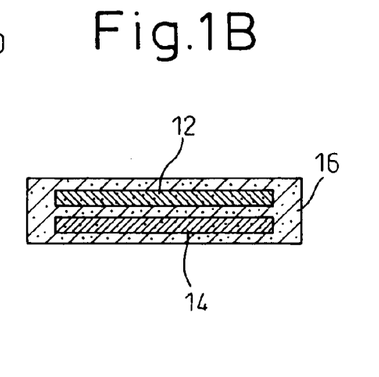
Figure 1C:
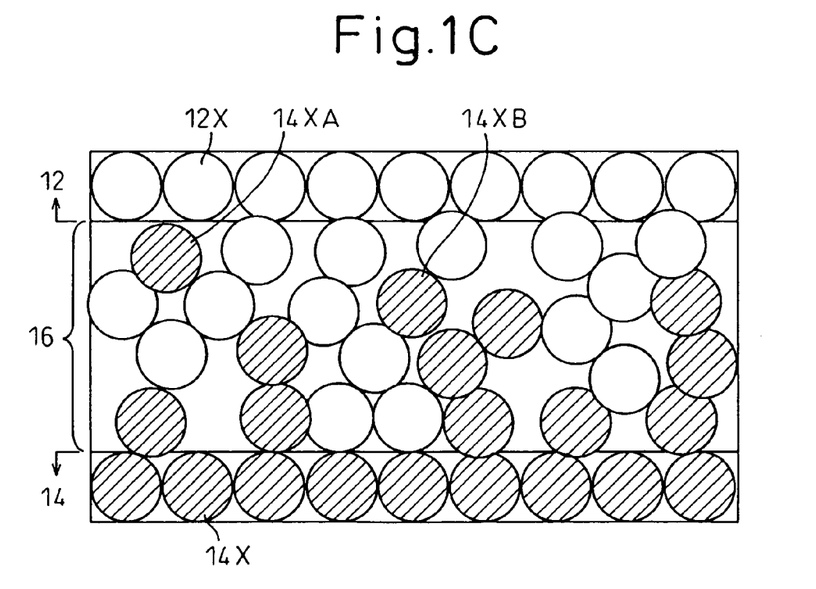

An example of a pn junction type semiconductor used as a cell of a fuel cell according to the present invention is shown in FIGS. 1A and 1B. A front view of the pn junction type semiconductor 10 is shown in FIG. 1A, while a horizontal sectional view along the line B—B shown in FIG. 1A is shown in FIG. 1B. FIG. 1C is a sectional view showing enlarged the center of FIG. 1B. The pn junction type semiconductor 10 illustrated is comprised of an n-type semiconductor 12 formed as an electrode 12a with one end connected to a Pt wire and a p-type semiconductor 14 formed as an electrode 14a with one end connected to a Pt wire.

The n-type semiconductor 12 and the p-type semiconductor 14 are bonded through a pn mixed layer 16 formed from particles of the ingredient forming the n-type semiconductor 12 and particles of the ingredient forming the p-type semiconductor 14 mixed together. The outer circumference of the n-type semiconductor 12 and the p-type semiconductor 14 are also covered by the pn mixed layer 16. The n-type semiconductor 12, the p-type semiconductor 14, and the pn mixed layer 16 are formed porous to an extent enabling the mixed fuel gas to pass. Therefore, the mixed fuel gas passes through the n-type semiconductor 12, p-type semiconductor 14, and pn mixed layer 16. During this, the oxygen and fuel gas are adsorbed and reacted at the surface of the p-type semiconductor and the surface of the n-type semiconductor adjoining each other across the porous layer (pn boundary phase). The chemical energy can be taken out as electrical energy.

As shown enlarged in part in FIG. 1C, there is a pn mixed layer 16 between the n-type semiconductor 12 and p-type semiconductor 14, so the area of the pn junction surfaces forming the actual reaction interface can be increased. Therefore, it is possible to take out more energy per apparent unit area. That is, in the pn mixed layer 16, large numbers of pn junction surfaces are formed between the n-type semiconductor particles 12x and p-type semiconductor particles 14x. Overall, a large reaction interface is provided.

Note that in FIG. 1C, the n-type semiconductor particles 12x of the n-type semiconductor 12 and the p-type semiconductor particles 14x of the p-type semiconductor 14 are shown in close contact with each other with no voids. However, this is for convenience in illustration. In actuality, there are voids of an extent enabling gas to pass between the n-type semiconductor particles 12x of the n-type semiconductor 12 and the p-type semiconductor particles 14x of the p-type semiconductor 14. Here, it is not possible to take electrical energy outside from the pn junctions of the particles isolated as 12xA in the figure. Also, the p-type semiconductor particles 14xB at the center are shown isolated from the other p-type semiconductor particles 14x in the sectional view, but are not isolated three-dimensionally and function as effective energy generating sites together with other p-type semiconductor particles 14.

The semiconductor used in the present invention contacts the fuel gas and oxygen and reaction products of the two (water, $CO_2$, etc.) Further, the temperature of the semiconductor rises along with the oxidation reaction of the fuel. Therefore, a material which is chemically and physically stable and is not impaired in function as a semiconductor or difficult to be so impaired even if contacting these atmospheres and even at a high temperature (several hundred ° C.) is desirable. From this viewpoint, the following material is desirable as a semiconductor material used in the present invention.

In the pn junction type semiconductor 10, the n-type semiconductor 12 can be formed using a known material enabling formation of an n-type semiconductor, for example, one or more of zinc oxide (ZnO), titanium (IV) oxide ($TiO_2$), tin (IV) oxide ($SnO_2$), iron (III) oxide ($Fe_2O_3$), and nickel oxide (NiO).

The p-type semiconductor 14 can be formed using all known materials able to form a p-type semiconductor, for example, one or more of cobalt oxide (CoO), iron oxide black ($Fe_3O_4$), and copper (I) oxide ($Cu_2O$). Further, the following single element semiconductor materials and compound semiconductor materials can be used both as the p-type and n-type by selection of the dopant.

Single element semiconductor material:
Si, Ge
Compound semiconductor material:
III–V Group: GaAs, InP, GaN, etc.
II–VI Group: ZnS, ZnSe, etc.
IV—IV Group: SiC, SiGe, etc.
(In particular, SiC functions as a semiconductor even at high temperatures)

The pn mixed layer 16 can be formed by mixing ingredient able to form the n-type semiconductor and ingredient able to form the p-type semiconductor. During this mixture, it is possible to form a pn mixed layer 16 in which an oxidation catalyst is included by adding and mixing in an oxidation catalyst. As such an oxidation catalyst, it is possible to suitably use nickel oxide (NiO). This nickel oxide (NiO) has a function as an oxidation catalyst and a function as an ingredient able to form a p-type semiconductor. Further, the ingredients forming the pn mixed layer 16 may be the same as the ingredients forming the n-type semiconductor 12 and p-type semiconductor 14 or may be different.

Further, to form the p-type semiconductor 12, the p-type semiconductor 14, and the pn mixed layer 16 porous to an extent where the mixed fuel gas can pass, a Pt mesh comprised of for example platinum (Pt) is coated with a solution or paste including the ingredient able to form an n-type semiconductor 12 or p-type semiconductor 14 and dried to obtain an n-type semiconductor precursor or p-type semiconductor precursor. Next, a pn mixed layer paste obtained by mixing the ingredient able to form the n-type semiconductor 12 and the ingredient able to form the p-type semiconductor 14 is coated between the n-type semiconductor precursor and p-type semiconductor precursor and the outer circumference of the two precursors to obtain a bonded assembly. Afterward, by sintering the obtained bonded assembly at a predetermined temperature for a predetermined time, the n-type semiconductor 12, p-type semiconductor 14, and pn mixed layer 16 can give a pn junction type semiconductor 10 formed porous to an extent where mixed fuel gas can pass.

In the present invention, with a fuel cell using a pn junction type semiconductor, it is necessary to place the pn junction type semiconductor in a mixed fuel gas atmosphere. However, a mixed fuel gas of a composition within the ignition limit has the danger of exploding if ignited. Therefore, it may be considered to adjust the composition of the fuel gas and oxygen of the mixed fuel gas to dilute one of the fuel gas and oxygen to a great extent and supply mixed fuel gas adjusted to a composition outside the ignition limit. However, with a mixed fuel gas where one of the fuel gas and oxygen is extremely diluted, the power generation efficiency at the fuel cell falls, so from the viewpoint of the power generation efficiency of the fuel cell, it is effective to supply mixed fuel gas of a composition within the ignition limit.

According to studies of the inventors, even in a space where mixed fuel gas of a composition within the ignition limit is supplied, by filling the space with a filler and making the gap between the filler particles smaller than the distance where ignition is impossible even in the presence of the mixed fuel gas, specifically the extinguishing distance of the mixed fuel gas, it is possible to avoid the danger of any mixed fuel gas of a composition within the ignition range igniting and exploding.

The "extinguishing distance of the mixed fuel gas" explained here is defined in Kagaku Binran (*Oyo Kagakuhen II*) (*Chemical Handbook (Applied Chemistry Edition II)*), Japan Society of Chemists ed., Nov. 15, 1988, second printing, p. 407 and is the minimum distance between electrodes at which mixed fuel gas can be ignited. With a distance between electrodes less than this, ignition will not occur no matter how great the energy. The extinguishing distance changes according to the concentration of oxygen, pressure, etc. in the mixed fuel gas, so it is preferable to experimentally find the extinguishing distance of the mixed fuel gas.

Figure 2:
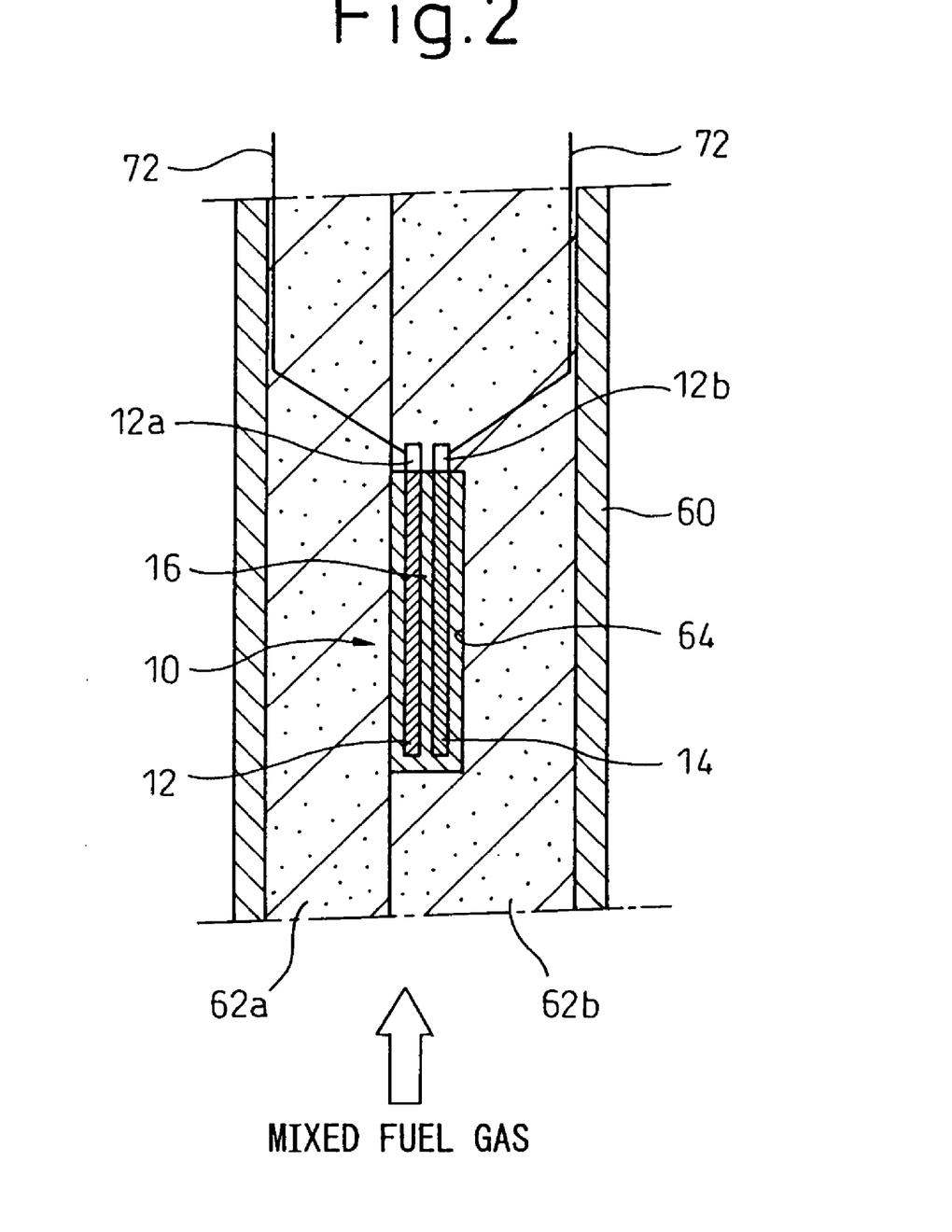
FIG. 2 is a partial sectional view for explaining a fuel cell including a pn junction type semiconductor shown in FIGS. 1A and 1B.

The pn junction type semiconductor 10 shown in FIG., 1A, as shown in FIG. 2, is sandwiched between ceramic porous bodies 62*a*, 62*b* to form a fuel cell. The fuel cell shown in FIG. 2 is comprised of an alumina ceramic pipe 60 in which alumina, separable ceramic porous bodies 62*a*, 62*b* are inserted. A recess 64 is formed at the parting surface of the ceramic porous body 62*a* with the ceramic porous body 62*b*. This recess 64 houses the pn junction type semiconductor 10. The electrodes 12*a* and 14*a* of the pn junction type semiconductor 10 housed in the recess 64 are welded to ends of PT leads 72, 72. The other ends of the Pt leads 72, 72 are passed through the porous bodies 62*a* and 62*b* and led outside of the ceramic pipe 60. The ceramic pipe 60 in which are inserted the ceramic porous bodies 62*a*, 62*b* sandwiching and housing the pn junction type semiconductor 10 is supplied with mixed fuel gas from one end.

The fuel cell shown in FIG. 2 can generate power at room temperature if the fuel gas of the mixed fuel gas can be held in its gaseous state at room temperature. However, if the fuel gas would condense at room temperature, it would be preferable to hold the fuel gas at a temperature where it can retain its gaseous state.

Figure 3:
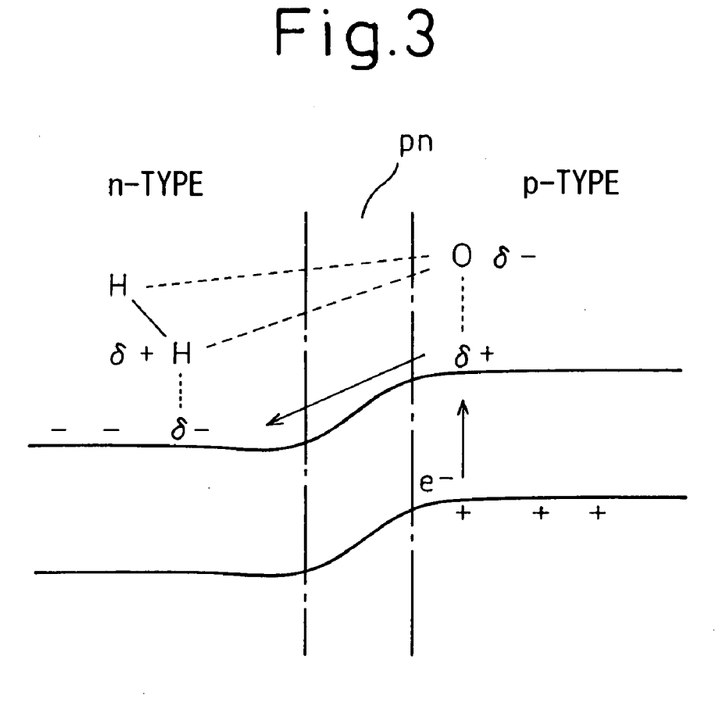
FIG. 3 is an explanatory view for explaining the power generation mechanism in a pn junction type semiconductor shown in FIGS. 1A and 1B.

The mechanism enabling generation of power by the supply of mixed fuel gas to the pn junction type semiconductor 10 is believed to be that shown in FIG. 3. FIG. 3 shows the energy band structure of a pn junction type semiconductor. The pn junction type semiconductor shown in FIG. 3 is formed by sandwiching a depletion layer (pn boundary phase) between a p-type semiconductor and n-type semiconductor.

When oxygen is adsorbed and polarized at the p-type semiconductor surface near the depletion layer (pn boundary phase) of the pn junction type semiconductor and simultaneously hydrogen is adsorbed and polarized at the n-type semiconductor surface, a plus charge ($\delta+$) is generated at the p-type semiconductor surface and a minus charge ($\delta-$) is generated at the n-type semiconductor surface.

In the series of processes of dissociation of water generated by reaction of the hydrogen and oxygen adsorbed in this way, electrons of the electronic band of the p-type semiconductor near the depletion layer (pn boundary phase) are excited and holes are generated at that valence band. Among the generated electron-hole pairs, the electrons move to the n-type semiconductor side, while the holes move to the p-type semiconductor side. As a result, a potential difference arises between the n-type semiconductor side and p-type semiconductor side and the potential difference can be taken out as electricity. Further, the movement of the electron-hole pairs is movement of electrons and holes. Therefore, compared with the case of conduction of oxygen ions through a solid electrolyte layer, the movement resistance can be substantially ignored.

Figure 4:
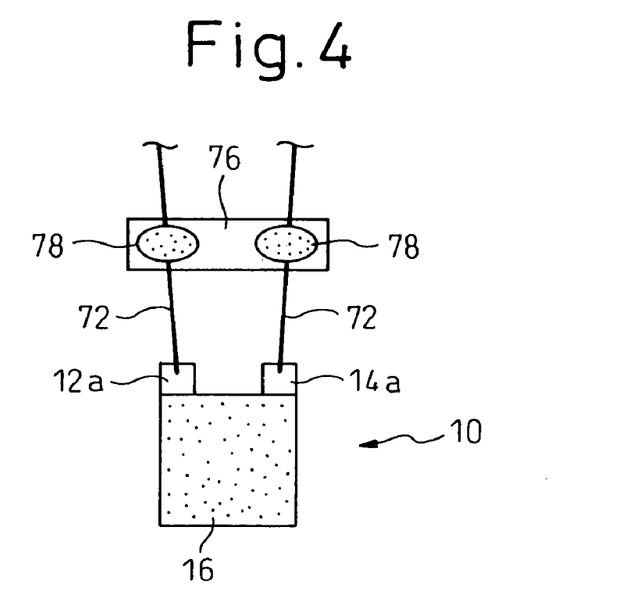
FIG. 4 is a front view for explaining another example of a pn junction type semiconductor.

When the mechanical strength of the pn junction type semiconductor 10 shown in FIGS. 1A to 1C is low, as shown in FIG. 4, it is preferable to reinforce the Pt leads 72, 72 welded to the electrodes 12*a* and 14*b* in the middle by bonding them to an alumina plate 76 by an inorganic adhesive 78, 78. Further, the pn junction type semiconductor 10 shown in FIGS. 1A to 1C is comprised of the n-type semiconductor 12 and the p-type semiconductor 14 bonded together through the pn mixed layer 16, but when a large bonding area can be obtained between the n-type semiconductor 12 and p-type semiconductor 14, it is also possible to directly bond the n-type semiconductor 12 and p-type semiconductor 14. Further, in this case, the pn mixed layer 16 covering the outer circumference of the n-type semiconductor 12 and the p-type semiconductor 14 can also be omitted.

EXAMPLES

Example 1

(1) Production of pn Junction Type Semiconductor 10

A Pt mesh welded to one end of the Pt wire 72 was dipped in a 0.5 mol/L aqueous solution of cobalt acetate, then was heated by an industrial drier to break down the cobalt acetate to cobalt oxide (CoO). The work was repeated tens of times to form a p-type semiconductor precursor. Further, a Pt mesh welded to one end of the Pt wire 72 was coated with a paste comprised of a powder of zinc oxide (ZnO) to which terpineol was added and dried at 100° C. to form an n-type semiconductor precursor.

Further, equimolar amounts of cobalt acetate and zinc oxide were mixed, then nickel oxide (5 wt %) was mixed to obtain a mixed power. Terpineol was added to this to obtain a pn mixed layer paste. Next, the obtained p-type semiconductor precursor and n-type semiconductor precursor were bonded through a pn mixed layer paste to obtain a bonded assembly. The outer circumference of this bonded assembly was also coated with the pn mixed layer paste.

Next, the Pt wires extended from the p-type semiconductor precursor and the n-type semiconductor precursor were reinforced midway by being bonded to alumina plate by an inorganic adhesive, then the bonded assembly of the p-type semiconductor precursor, n-type semiconductor precursor, and pn mixed layer paste was sintered at 900° C. for 1 hour to obtain the pn junction type semiconductor 10 shown in FIG. 4. The pn junction type semiconductor 10, as shown in FIGS. 1A to 1C, was comprised of the n-type semiconductor 12 and p-type semiconductor 14 bonded through a pn mixed layer 16. The outer circumference of the n-type semiconductor 12 and the p-type semiconductor 14 was also covered by the pn mixed layer 16.

(2) Measurement of Resistance Value

The resistance value of the obtained pn junction type semiconductor 10 was measured by a tester. According to this measurement, the resistance value when passing current from the n-type semiconductor 12 in the direction of the p-type semiconductor 14 (forward bias direction) was about 0.5 MΩ. As opposed to this, the resistance value when passing current from the p-type semiconductor 14 in the direction of the n-type semiconductor 12 (reverse bias direction) was about 1.2 MΩ. The pn junction type semiconductor 10 obtained in this way had a resistance value exhibiting electrical anisotropy, so this means a pn junction was formed inside.

(3) Power Generation Experiment

The obtained pn junction type semiconductor 10, as shown in FIG. 2, was sandwiched between ceramic porous bodies 62a, 62b and was inserted into an alumina ceramic pipe 60 together with the ceramic porous bodies 62a, 62a to form a fuel cell. Before supplying mixed fuel gas to the fuel cell, the other ends of the Pt wires 72, 72 welded to the electrodes 12a and 14a of the pn junction type semiconductor 10 were connected to a multimeter and the voltage difference between the electrodes 12a and 14a was measured. The voltage difference between the electrodes 12a and 14a was +28 mV. This potential difference was considered to be due to the diffusion potential in the pn junction type semiconductor 10.

Next, a mixed fuel gas of oxygen and hydrogen mixed in a ratio of 1:2 was supplied from one end of the ceramic pipe 60 and the voltage difference between the electrodes 12a and 14a (power generation potential) was measured by a multimeter. As a result, after the mixed fuel gas began to be supplied, the power generation potential between the electrodes 12a and 14a was 160 mV. Further, the short-circuit current between the electrodes 12a and 14a was measured and found to be 1.6 μA. The pn junction type semiconductor 10 obtained in this way was confirmed to generate power by the supply of a mixed fuel gas of hydrogen and oxygen.

Example 2

The pn junction type semiconductor 10 used in Example 1 was placed on a hot plate and ethanol was dropped on the pn junction type semiconductor 10. The power generation potential and short-circuit current were measured by a multimeter. Further, the temperature of the hot plate was also changed and the power generation potential and short-circuit current of the resultant pn junction type semiconductor 10 were measured. The results are shown together in Table 1.

TABLE

| Temperature (° C.) | Power generation potential (mV) | Short-circuit current (μA) |
|---|---|---|
| Room temperature | 61 | 0.2 |
| 50 | 156 | 2.9 |
| 60 | 118 | — |
| 70 | 80 | — |

As clear from Table 1, the pn junction type semiconductor 10 exhibited a power generation function even at room temperature. This phenomenon is believed to be derived from the fact that ethanol exhibits a predetermined vapor pressure even under room temperature, so the ethanol vapor reacts with the oxygen in the air. This is judged to be because the maximum power generation potential is exhibited at 50° C.—a temperature where ethanol more easily evaporates than at room temperature. However, if making the temperature of the hot plate more than 50° C., the power generation potential of the pn junction type semiconductor 10 falls. This is believed to be due to the temperature dependency of the pn junction type semiconductor 10.

Example 3

The same procedure was followed as in Example 2 to measure the power generation potential except for maintaining the temperature of the hot plate at 50° C. and using methanol instead of ethanol. As a result, the power generation potential of the pn junction type semiconductor 10 was 41 mV. Even with methanol, it is possible to generate power by the pn junction type semiconductor 10.

Example 4

The same procedure was followed as in Example 1 to obtain a pn junction type semiconductor 10 except for using as the pn mixed layer paste a mixed powder comprised of equimolar amounts of cobalt oxide and zinc oxide mixed together with terpineol without nickel oxide (5 wt %). Next, a power generation experiment was conducted in the same way as in Example 1 using the obtained pn junction type semiconductor 10, whereupon the power generation potential was 110 mV and the short-circuit current was 3.2 μA.

Summarizing the effects of the invention, the fuel cell according to the present invention is a single chamber fuel cell using a pn junction type semiconductor as a cell, so the structure can be simplified and power can be generated at room temperature or a low temperature of about 50° C. Therefore, this can be used for a low temperature fuel cell for the home, a car, etc.

While the invention has been described with reference to specific embodiments chosen for purpose of illustration, it should be apparent that numerous modifications could be made thereto by those skilled in the art without departing from the basic concept and scope of the invention.

What is claimed is:

1. A single chamber fuel cell comprised of a cell placed in a chamber capable of being supplied with a mixed fuel gas comprised of hydrogen or another fuel gas and oxygen, wherein
said cell used is a pn junction type semiconductor having electrodes of a p-type semiconductor with carriers of holes and an n-type semiconductor with carriers of electrons connected to ends of electrical takeout wires, and when the mixed fuel gas is supplied through the chamber, each of said p-type semiconductor and n-type semiconductor is formed porous to an extent enabling said mixed fuel gas to pass;

wherein said p-type semiconductor and n-type semiconductor are provided between them with a porous pn mixed layer formed by particles of said p-type semiconductor and particles of said n-type semiconductor mixed together to an extent enabling mixed fuel gas to pass.

2. A fuel cell as set forth in claim 1, wherein said pn mixed layer includes an oxidation catalyst.

* * * * *

UNITED STATES PATENT AND TRADEMARK OFFICE
CERTIFICATE OF CORRECTION

PATENT NO. : 7,169,501 B2
APPLICATION NO. : 10/732233
DATED : January 30, 2007
INVENTOR(S) : Shigeaki Suganuma et al.

It is certified that error appears in the above-identified patent and that said Letters Patent is hereby corrected as shown below:

First Page, Column 2 Item (56) (Other Publications), Line 7, change "Annex" to --Annex dated--.

Column 4, Line 39, after "temperatures)" insert --.--.

Signed and Sealed this

Fifteenth Day of May, 2007

JON W. DUDAS
*Director of the United States Patent and Trademark Office*